Apr. 24, 1923.
F. J. SCHUMAN
METHOD OF AND APPARATUS FOR WELDING
Filed March 31, 1920
1,452,936
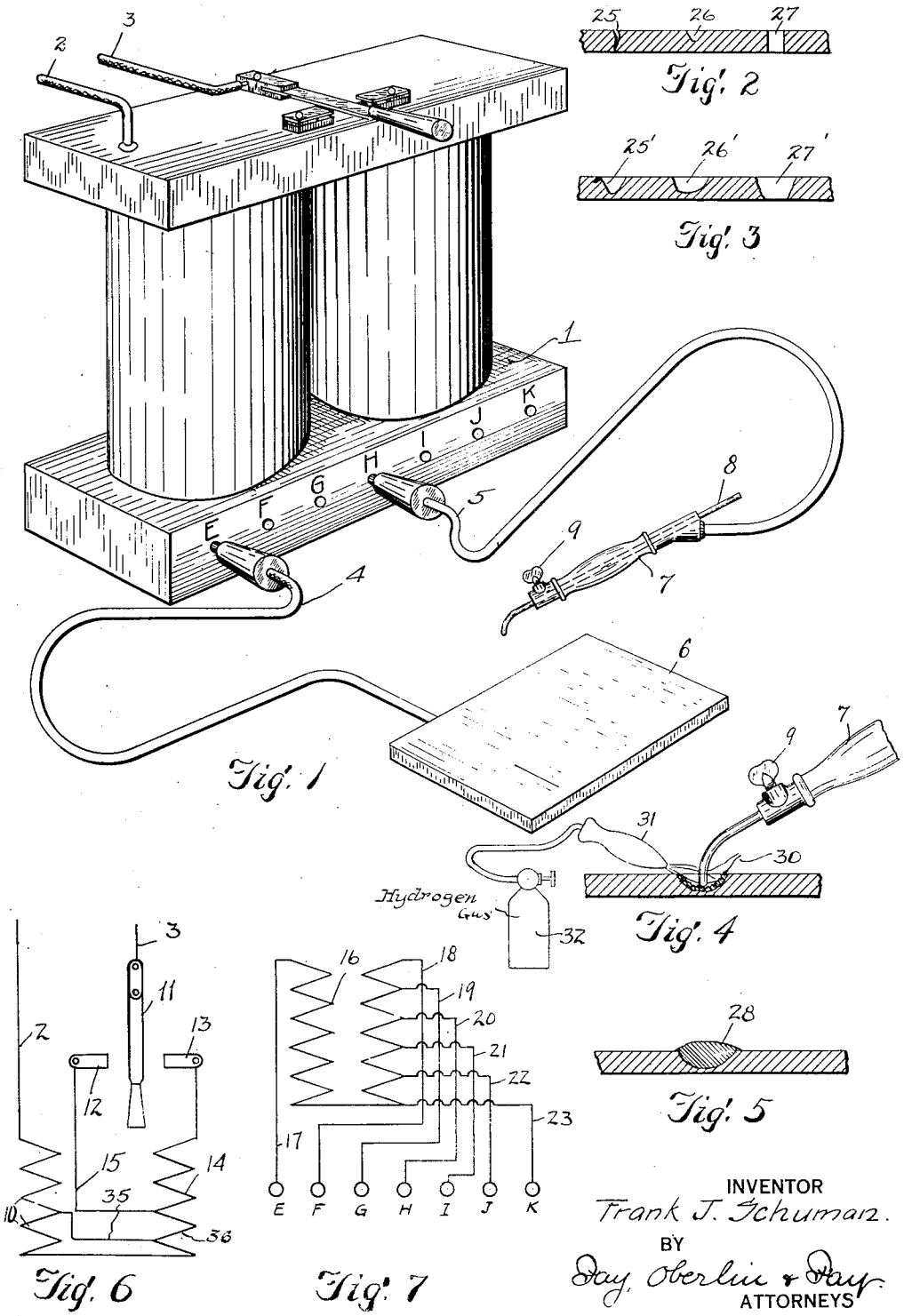

Patented Apr. 24, 1923.

1,452,936

UNITED STATES PATENT OFFICE.

FRANK J. SCHUMAN, OF CLEVELAND HEIGHTS, OHIO, ASSIGNOR TO THE ALLAN MANUFACTURING AND WELDING CORPORATION, OF BUFFALO, NEW YORK, A CORPORATION OF NEW YORK.

METHOD OF AND APPARATUS FOR WELDING.

Application filed March 31, 1920. Serial No. 370,168.

*To all whom it may concern:*

Be it known that I, FRANK J. SCHUMAN, a citizen of the United States, and a resident of Cleveland Heights, county of Cuyahoga, and State of Ohio, have invented a new and useful Improvement in Methods of and Apparatus for Welding, of which the following is a specification, the principle of the invention being herein explained, and the best mode in which I have contemplated applying that principle so as to distinguish it from other inventions.

The present invention relates, as indicated, to a method of and apparatus for welding, and is particularly directed to an improved method and apparatus for repairing steel and iron castings, such, for example, as automobile cylinders, crank shafts, fly-wheels, timing gears, valve parts and the like, which require machining after the repairing of the defects. It has been found that by the present method a perfect repair can be made which will not only permit machining without injury to the casting, but will also give satisfactory service even under high temperatures and pressures. To the accomplishment of the foregoing and related ends, said invention, then, consists of the means hereinafter fully described and particularly pointed out in the claims.

The annexed drawings and the following description set forth in detail certain means and one mode of carrying out the invention, such disclosed means and mode illustrating, however, but one of various ways in which the principle of the invention may be used.

In said annexed drawing:—

Fig. 1 is a perspective view of my apparatus; Fig. 2 is a section through a plate illustrating the types of defects which are found in castings; Fig. 3 is a similar view showing the same defects after having been prepared for repairing by my improved method; Fig. 4 is a similar section illustrating the working of the method; Fig. 5 is a view similar to Fig. 4 showing the completed article; and Figs. 6 and 7 are diagrammatic views illustrating the circuit connections through the transformer shown in Fig. 1.

The chief difficulty in welding articles which have already been machined, or which must be machined after the welding, is the hardness which is produced in the surrounding metal by the welding operation, which makes it extremely difficult to do any machining after the welding. This hardening of the surrounding metal is usually due to the oxidation caused by the welding operation when performed in the usual methods, and this oxidation is entirely avoided by my improved methods.

In Fig. 1 I have shown one form of mechanism adapted to carry out my improved method, the mechanism consisting of a transformer 1 provided with incoming and return electric lines 2 and 3, and with a series of connections E, F, G, H, I, J and K, for attachment to the electrical lines 4 and 5, of which the former extends to a second plate 6, while the latter is connected to a holder 7, in which is carried the metal welding pencil 8, which may be removably clamped in the holder by means of a convenient set screw 9. The circuit connections in the transformer are shown in Figs. 6 and 7. In Fig. 6 there is shown the primary coil 10 connected to the incoming line 2 and adapted to be connected to the return line 3 by means of a switch 11, which may be thrown either to engage with the contact 12 or the contact 13. When engaged with the latter the circuit is thrown the entire length of the primary coil, but when engaged with the contact 12 the portion of the primary coil between the point 14 and the contact 13 is disconnected from the circuit and the current returns through the shunt connection 15 extending from the contact 12 to a point intermediate of the ends of the primary coil.

The circuit connections through the secondary coil are shown in Fig. 7. One end of the secondary coil 16 is connected to the contact E by the line 17, while the other end of the secondary coil is connected to the next adjacent contact F by a line 18. The other contacts G, H, I, J and K are successively connected to adjacent points along the secondary coil by means of lines 19, 20, 21, 22 and 23, respectively.

The secondary coil is always connected to the ground plate 6 through the connection 17, but by shifting the connection 5 along the contacts F, G, H, etc., it is possible to vary the voltage of the secondary coil to suit the varying conditions of welding. When the switch 11 is connected with a contact 13 and the entire primary coil is in circuit, if the contact 5 is connected to the contact K a voltage of 24 volts is impressed upon the welding circuit through the pencil 8. By shifting the contact 5 along the base of the transformer toward the contact E, and by properly proportioning the tap-offs from the transformer it is possible to secure a voltage difference for each successive connection along the base of the transformer of each volt, thus giving a voltage of 23 at the contact J, 22 at the contact I, 21 at the contact H, 20 at the contact G and 19 at the contact F. If the switch member 11 is then shifted to cut out a part of the primary coil by engaging it with the contact 12, additional voltage drops can be secured by repeating the successive connections of the contact 5 along the transformer base, beginning at the contact K and ending at the contact F as before, the last-named connection giving a voltage of 13 volts. With an extremely light and simple transformer mechanism it is possible in this way to secure a voltage range of from 24 to 13, which is sufficient for the ordinary welding purposes, while additional voltages can of course readily be secured by increasing the number of tap-offs from the secondary coil, or by providing a three-way switch and cutting out different amounts of the primary coil.

In Fig. 2 I have shown the customary defects in castings which must be repaired by welding. There is here shown a deep but narrow crack 25, a fairly shallow blow hole 26 and a hole 27 extending directly through a plate. For repairing, these three defects must be cut out to give the shape of recess shown at 25′, 26′ and 27′, in Fig. 3. This is necessary, not only to facilitate the welding operation, but also to thoroughly clean the surface to be welded.

The method of welding is in each case about the same, and in Figs. 4 and 5 I have shown the welding operation. The voltage is adjusted to suit the cross-sectional size of the pencil that has been selected for use, and a nickel pencil of the desired size is inserted and held in the holder 7. The circuit is then closed and the operator touches the pencil to the surface of the recess that is to be repaired, and then removes the pencil, leaving a drop of nickel deposited. This operation is then repeated until the entire recess is filled. A certain excess amount of nickel is deposited, leaving the repaired plate in the condition shown in Fig. 5 with a slightly bulging deposit 8 of nickel in the recess. During the welding operation a hydrogen flame 30 from a burner 31 is directed against the recess in such a way as to maintain the arc at the base of the flame, at which point no oxidation can take place as no air is present at this point, and in this way it is possible to avoid all oxidation, either of the iron of the plate or of the nickel which is being deposited. The operator may conveniently hold the welding socket 7 in one hand and the hydrogen burner 31 in the other and play the flame on the recess so as to entirely cover the walls of the same and bring the pencil end well within the reducing portion of the flame. Hydrogen may be supplied from a small portable tank 33, which may be easily carried with the remainder of the apparatus.

After the nickel has been deposited in the recess the plate may be machined in the usual way to give a finished surface, and it is practically impossible to detect the presence of the nickel in the plate, either by eye or by the action of the plate under ordinary conditions. In repairing automobile cylinders by this method it has been found that the cylinder walls will stand the temperature which is customary in automobile cylinders without any bad results, and will stand the testing water pressures which obtain, which are as high as 100 pounds per square inch in the water jackets. Furthermore, it has been found possible to repair crank shafts and cam shafts which are subjected to extremely high strains, and valve seats which are subjected to very high temperatures, as well as to corrosive and burning gases, in such a way that they will not warp or burn when in service. The method can be carried on by the simple apparatus shown, which can be made so light that it is readily portable by one man, and very much better results can be obtained by this method of welding than by the oxyacetylene method which produces hardening in the deposited metal and also in the surrounding portions of the article being repaired.

In Fig. 6 I have additionally shown a modified type of transformer winding which may be employed, in which a portion 35 of the winding 36 is connected in shunt, which serves to prevent an excessive voltage when the entire coil is used because of the counter electromotive force built up in this portion of the coil.

For many repairs pure nickel gives the best results and particularly under conditions where wear rather than pressure is the quality desired in the repaired article. In cases where hardness and tensile strength are required a composition welding pencil may be used in which iron and nickel in varying proportions may be used, the percentage of iron being increased in proportion to the hardness in the repaired article. In certain cases the iron percentage may be as high as fifty per cent, although usually a much smaller amount is sufficient.

Other modes of applying the principle of my invention may be employed instead of the one explained, change being made as regards the steps or mechanism herein disclosed, provided the means stated by any of the following claims or the equivalent of such stated means be employed.

I therefore particularly point out and distinctly claim as my invention:—

1. In a method of filling recesses in iron articles, the steps which consist in establishing a closed electrical circuit through a nickel pencil and the wall of such recess until a drop of the nickel has melted and deposited, and then moving such pencil to a new point on such wall and repeating such operation.

2. In a method of filling recesses in iron articles, the steps which consist in establishing a closed electrical circuit through a nickel pencil and the wall of such recess until a drop of the nickel has melted and deposited, maintaining a non-oxidizing atmosphere about the point of contact between such wall and said pencil, and then moving such pencil to a new point on such wall and repeating such operation.

3. In a method of filling recesses in iron articles, the steps which consist in establishing a closed electrical circuit through a nickel pencil and the wall of such recess until a drop of nickel has melted and deposited, directing a hydrogen flame at the wall contacting the end of said pencil, and then moving such pencil to a new point on such wall and repeating such operations.

Signed by me, this 25 day of March, 1920.

FRANK J. SCHUMAN.